(12) United States Patent
Hirsch (10) Patent No.: US 10,092,825 B2
(45) Date of Patent: Oct. 9, 2018

(54) SYSTEM, METHOD, AND APPARATUS FOR A GAME OF SKILL

(71) Applicant: David Hirsch, Tampa, FL (US)

(72) Inventor: David Hirsch, Tampa, FL (US)

( * ) Notice: Subject to any disclaimer, the term of this patent is extended or adjusted under 35 U.S.C. 154(b) by 573 days.

(21) Appl. No.: 14/687,954

(22) Filed: Apr. 16, 2015

(65) Prior Publication Data

US 2015/0298000 A1  Oct. 22, 2015

Related U.S. Application Data

(60) Provisional application No. 61/980,611, filed on Apr. 17, 2014.

(51) Int. Cl.
*A63F 13/00* (2014.01)

(52) U.S. Cl.
CPC .................................. *A63F 13/00* (2013.01)

(58) Field of Classification Search
USPC .......................................................... 463/42
See application file for complete search history.

(56) References Cited

U.S. PATENT DOCUMENTS

| 2001/0003099 A1* | 6/2001 | Von Kohorn | ........... A63F 13/12 463/40 |
| 2003/0003990 A1* | 1/2003 | Von Kohorn | ........... A63F 13/12 463/25 |
| 2003/0078829 A1* | 4/2003 | Chen | ...................... G06Q 10/06 705/7.28 |
| 2009/0186679 A1* | 7/2009 | Irvine | .................... A63F 13/12 463/16 |

* cited by examiner

*Primary Examiner* — Pierre E Elisca
(74) *Attorney, Agent, or Firm* — Larson & Larson, P.A.; Frank Liebenow; Justin P. Miller (57) ABSTRACT

A gaming system includes a server having a basket containing a set of events, each event having an element of predictability and an element of randomness. User devices connected to the server accept user selections with respect to a pre-determined game and each user selection includes an ordered list of a subset of the basket. The gaming system has a way to determine results of the plurality of events and a way to determine if any of the user selections matches the results, and if so, declaring a winner.

20 Claims, 10 Drawing Sheets

| Picks (pick 5) | Start 14-APR-14, Finish 18-APR-14 | | |
|---|---|---|---|
| Stock | USR1 | USR2 | USR3 |
| INTC | | | |
| MSFT | | | |
| AAPL | 5 | 5 | 5 |
| PG | | | |
| VZ | 2 | 4 | 2 |
| T | | | |
| GMF | | | |
| MMM | | | |
| GE | | 2 | 4 |
| HPQ | | | |
| DAL | 4 | | |
| AMD | | | 3 |
| IBM | | | |
| MSI | 3 | 3 | |
| CMCSA | | | |
| HZO | | | |
| AMD | | | |
| AMAT | 1 | 1 | |
| KMB | | | 1 |

Click here to get 20 free stock trades

| Results (pick 5) | Start 14-APR-14, Finish 18-APR-14 | | | |
|---|---|---|---|---|
| Stock | USR1 | USR2 | USR3 | Results |
| INTC | | | | |
| MSFT | | | | |
| AAPL | 5 | 5 | 5 | 5 |
| PG | | 4 | 2 | 4 |
| VZ | 2 | | | |
| T | | | | |
| GMF | | | | |
| MMM | | | | |
| GE | | 3 | 4 | 2 |
| HPQ | | | 3 | |
| DAL | 4 | | | |
| AMD | | | | |
| IBM | | | | |
| MSI | 3 | 2 | | 3 |
| CMCSA | | | | |
| HZO | | | | |
| AMD | | | | |
| AMAT | 1 | 1 | 1 | 1 |
| KMB | | | | |

Click here to get 20 free stock trades

Picks (pick 4) Start 14-NOV-14, Finish 15-NOV-14

| Quarterback | USR1 | USR2 | USR3 |
|---|---|---|---|
| Roethlisberger | 4 | | |
| Manning, E. | 1 | 1 | 1 |
| Manning, P | | 4 | 2 |
| Farve | | | |
| Falcco | 2 | | |
| Rodgers | | | |
| Luck | | | 3 |
| Brady | | | |
| Brees | | 2 | |
| Rodgers | | | 4 |
| McCown | | | |
| Tannehill | | | |
| Carr | | | |
| Ryan | 3 | | |
| Lindley | | 3 | |
| Cutler | | | |
| Orton | | | |
| Stafford | | | |
| Romo | | | |
| Bortles | | | |
| Daniel | | | |
| Bridgewater | | | |
| Newton | | | |
| Rivers | | | |
| Whitehurst | | | |

Click here to get 20 free stock trades — 104

| Results (pick 4) | USR1 | USR2 | USR3 | Results |
|---|---|---|---|---|
| Quarterback | | | | |
| Roethlisberger | | | | |
| Manning, E. | 4 | | | |
| Manning, P | 1 | 1 | 1 | 1 |
| Farve | | 4 | 2 | 2 |
| Falco | | | | |
| Rodgers | 2 | | | |
| Luck | | | 3 | 3 |
| Brady | | | | |
| Brees | | | | |
| McCown | | 2 | 4 | 4 |
| Tannehill | | | | |
| Carr | | | | |
| Ryan | | | | |
| Lindley | | | | |
| Cutler | 3 | 3 | | |
| Orton | | | | |
| Stafford | | | | |
| Romo | | | | |
| Bortles | | | | |
| Daniel | | | | |
| Bridgewater | | | | |
| Newton | | | | |
| Rivers | | | | |
| Whitehurst | | | | |

104 — Click here to get 20 free stock trades [OK]

SYSTEM, METHOD, AND APPARATUS FOR A GAME OF SKILL

CROSS-REFERENCE TO RELATED APPLICATION

This application claims the benefit of U.S. provisional application No. 61/980,611 filed on Apr. 17, 2014, the disclosure of which is incorporated by reference.

FIELD

This invention relates to the fields of entertainment and education and more particularly to a system for using objective criteria for administering a game of skill where predictions are made on certain outcomes based on the knowledge and abilities of a participant.

BACKGROUND

Games of skill typically rely upon the knowledge and/or ability of the participants in determining the outcome. However, almost all games of skill possess some level of randomness or chance.

Games of skill are technically not considered gambling, whereas, gambling typically relies almost entirely upon a random even or set of events that are difficult, if not impossible, for anyone, including the game operator, to predict or manipulate to gain an advantage. This level of randomness is achieved, for example, by a well-shuffled deck of cards, a well-balanced set of die, a coin toss, a sequence of balls from a bingo machine, etc.

In contrast, a game of skill depends, at least somewhat, upon each participants skills, but being a game, there is still some level of randomness, otherwise, the most skillful participant will always win. One of the challenges that operators of games of skill face is to establish rules and scoring criteria that are fair with completely objective standards that are outside the control of the participants and the game operator.

The Internet presents great opportunities along with real skepticism for operators of games of skill. When such a game is Internet-based, the player must assume that the game is being operated fairly and that the game operator or other participants are not cheating, etc. What if the on-line game operator or other participants have the ability to manipulate the game's parameters while the game is progress causing a participant to lose? How would the player know if this is happening if the parameters are hidden or subjective?

Millions of players take part in State run lotteries each week, spending billions of dollars to buy lottery tickets in hopes of picking the winning numbers. Again, the players count on the fact that the number selection process is truly random and that the lottery is not rigged. In such, often state regulators audit the lottery and the drawings are witnessed by, for example, an auditor or, at times, televised on television for all to watch. Great pain is taken to assure the integrity of the process used to select the winning numbers and to make sure it is truly random and cannot be manipulated by the lottery operator or its participants or permit certain players from picking numbers that are more likely to be selected. In fact, the viability of any lottery is dependent upon its fairness.

Recently, some organizations offer some sort of game or contest to entice potential clients to a web site, perhaps to present those potential clients with advertisements or enroll them into an organization, etc. Notably, recently during a college basketball season tournament, a national lending company ran a contest for predicting the winners of each game of a large tournament (bracket) where the predictions were made before the tournament began. The contest was scored based on accuracy with participants being ranked based on the number of winners they selected. More points were awarded for the predictions of the winners of later-stage rounds in the tournament. Those who had the highest score and were the most accurate at the end of the tournament won substantial cash prizes. The contest also offered a contingent prize of a billion dollars to anyone who could pick all of the winners for each game of the entire tournament, which would result in a perfect score. Although the contest was a game of skill, requiring some knowledge of the teams that were competing, the odds of selecting the winners of every single game in the tournament and achieving a perfect score was remote. As such, nobody was able to win the contingent prize.

The example above relied on purely objective criteria for scoring with the parameters of the game being virtually impossible to manipulate (i.e. fixing multiple basketball game). Unfortunately, many games of skill lack objective criteria for scoring and can be manipulated. For example, some operators are now running competitions based on video games where the participants are ranked based on their ability to score higher in a completely virtual setting. Of course, the operator has the ability to change the programming of the video game and affect the outcomes. Furthermore, there is no way to determine whether or not an operator has done so. Additionally, there have been numerous examples of participants hacking into the computer system of the game operator to achieve an unfair advantage. When such an event occurs and is exposed, the viability of the game is usually compromised resulting in cessation of the game.

In the above mentioned games of skill, much effort is required for each participant to exercise that participant's skills. In other words, to impact skill onto selecting the winner of 32 sporting games, the player must know something about how the teams are aligned and, possibly, something about the skills of each individual team. To compete in a video game within a virtual setting, each participant must learn how to move and manipulate objects within that particular game and devote significant time to progress through the video game. In many situations, potential players do not want to invest huge amounts of time and effort.

What is needed is a skill-based gaming system that will provide a completely objective environment without the need for outside auditing, such that the scoring system and results can be readily verified and ascertained by the participants and the operator.

SUMMARY

People are typically more likely to participate in games where their knowledge and skill gives them an edge in predicting the outcomes, especially when the winners of a particular game have paid an entry fee to participate and/or could win money based on the outcome. People often have a desire to participate in a game of skill in which the game has purely objective criteria for scoring which is readily verifiable through an outside source.

One example is a fantasy stock market gaming format where the objective is to predict the top five performing stocks (the events) out of a basket of 25 (the event space) during the week of April $14^{th}$ (the event duration), where each stock selected is scored based on its percentage return during the contest period. Even if the participant knows great detail about the 25 companies, it is challenging to predict which of the 25 stocks will perform the best over, say, a one-week period. This gaming format affords a variety of methodologies for participant scoring and awarding of prizes. For example, participants might earn points based upon the performance of the stocks they have selected and at the completion of the contest; prizes are awarded to the participants who score the highest number of points. Another variation is where the objective is to predict the top five performing stocks, regardless of order, where points are awarded based on the number of correct predictions. Then, if you correctly predicted three of the top five performing stocks, you would win a certain prize; if you predicted four of the top five you would win an even larger prize and so on. Alternatively, another variation is where the objective is to predict the top five performing stocks in exact order. In this variation, prizes are awarded based on the number of correct predictions and a contingent prize is awarded for a perfect score where all five stocks the player selects actually finished in the exact order predicted.

Skill is required to select stocks in the basket that will perform the best; however, selecting the top five performing stocks, in order, and achieving a perfect score has a very small probability. Furthermore, since nobody can directly influence the stock market, the outcomes are entirely objective and verifiable, which virtually eliminates the opportunity for the game operator or any single participant to bias the outcomes. After the contest period is over, it is easy for each of the participants to know which stocks finished in which position, based upon stock market listings, etc. Further, although some level of skill and effort is required to select the top five performing stocks, in order, it is not of an undue burden for the player to make such selections as compared to picking the winners of 32 sporting events, etc.

Another example is a fantasy sports-based gaming format using, for example, American football where the objective is to predict the top five performing quarterbacks (for example) during the first week of the 2015 NFL Season, where quarterbacks who play during the week earn fantasy points based on various objective player statistics such as passing yards, rushing yards, passing touchdowns and rushing touchdowns. This gaming format affords a variety of methodologies for participant scoring and the awarding of prizes. For example, participants might earn the cumulative fantasy points of the players they have selected with prizes being awarded to the participants who score the highest number of points. Another variation is where the objective is to predict the top five performing quarterbacks based on fantasy points, regardless of order, where prizes are awarded according to the number of correct predictions (e.g., if you correctly predicted three of the top five performing quarterbacks, you win a first prize; if you predicted four of the top five you win a next, larger prize, and so on). Alternatively, another variation is where the objective is to predict the top five performing quarterbacks in exact order. In this variation, prizes are awarded to each participant that selects top five performing quarterbacks in the exact order. The amount of the prize is based on the number of correct predictions. In some embodiments, a contingent prize is awarded for a perfect score where all five quarterbacks predicted actually finished in a different order than predicted.

In the fantasy sports-based example, skill is required to select the players who will perform the best. For example, to select the top performing quarterbacks, the participant needs knowledge of the each quarterbacks basic abilities, the abilities of the opposing defense, the location of play, weather conditions, injuries, etc. Furthermore, since there is no way to influence the relative performance of all players who play during a given week of the regular NFL season, the outcomes are entirely objective and verifiable, which virtually eliminates the opportunity for the game operator or any single participant to bias the outcomes. After the contest period is over, it is easy for each of the participants to know which players finished in which position, based upon published performance statistics, etc.

In one embodiment, a game format includes a fantasy stock market gaming format where the operator creates two or more competing portfolios and the participants predict which portfolio will produce the highest percentage returns for the contest period. In this format, a portfolio would consist of one or more stocks and the performance of each portfolio is the cumulative performance of the assets contained therein. At the end of the contest period, all participants that select the winning portfolio split the prize pool equally.

In an alternate embodiment, the previous game format is applied in a fantasy sports-based setting using, for example, American football. In such, the operator creates two or more competing lineups and the participants predict which lineup will produce the most fantasy points during the contest period. In this, each lineup consists of one or more players. The points earned by a given lineup are the total fantasy points earned by the players in the lineup. For example, Lineup A consists of Quarterback A and Running Back A. Lineup B consists of Quarterback B and Running Back B. At the termination of the football games, all participants who select the winning lineup split the prize pool equally.

Again, skill is required to select the stocks or players who will perform the best while there is also an element of randomness. The outcomes are entirely objective and verifiable and after the contest period is over, it is easy for each of the participants to verify the results.

In another embodiment, a gaming system is disclosed including a server having a basket comprising a plurality of events, each of the events having both an element of predictability and an element of randomness. There are several user devices connected to the server. The user devices accept user selections with respect to a pre-determined game and each user selection includes an ordered list of a subset of the basket. In this, the outcome of the game is influenced by the skill and knowledge of the users. The gaming system has a way to determine results of the plurality of events and a way to determine the number of participants, if any, that match the results, regardless of order or in perfect order, and to award prizes based on that number of participants, where the prizes are independent of the amount of entries or the entry fees collected.

In another embodiment, a gaming system is disclosed including a server having a basket comprising a set of events and there are several user devices connected to the server. The user devices accept user selections with respect to a pre-determined game. Each user selection is one pre-configured subset out of two or more pre-configured subsets, where a subset contains one or more events and the outcome of the game is influenced by the skill and knowledge of the users. The server has a way to determine the results of the events and the performance of each pre-configured subsets from the basket based on objective criteria over a period of time and the server has a way to determine the performance of the selections of all users. Prizes are awarded to participants that selection the subset with the greatest relative performance.

In another embodiment, a gaming system is disclosed including a server and a set of x events that have both an element of predictability and an element of randomness. A plurality of participant selections is accepted before the start of a period of time. Each participant selection consisting of n of the events, in an order of expected results. At the end of the period of time, the gaming system uses algorithms to determining the order of the set of x events and algorithms for determining a score of the selections based upon the results, and if any of the selections match the order of the set of x events, to determine if any of the participants is a winner.

In another embodiment, a method of gaming is disclosed including participants selecting n events from a set of x events, in an order of expected results before the start of a period of time. Each of the events has both an element of predictability and an element of randomness. After the period of time ends, the order of the set of x is determined and then a comparison is made between each selected set of n events and a corresponding n events from the set of x, in order, and if any of the selected sets match the corresponding n events from the set of x, that selected set is declared a winner. Each of the set of x events have both an element of predictability and an element of randomness, therefore, one with knowledge or skill has an advantage while the element of randomness makes it difficult to make exact picks, even for an expert.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures.

Throughout this description, examples of a game of skill are given. Some examples are based upon a participant's selections compared to the performance of a selected number of stocks, n, out of a basket of stocks, x, over a period of time, t, is used. There is no limit on the number of stocks a participant must pick, n, the number of stocks in the basket of stocks, x, or the time period of time, t. Also, the stock market is used as a basis for the described game, but any set of events is anticipated, including, but not limited to, outcomes of a set of sporting events (e.g. select 5 teams that will improve standings out of 25 teams during one week, the results of an automobile racing competition, the performance of sporting players (e.g. select 5 players who will improve their batting average the most out of 40 players over the next five days), or the top 5 performing running backs based on running yardage for a given week's football games, etc.

Figure 1:
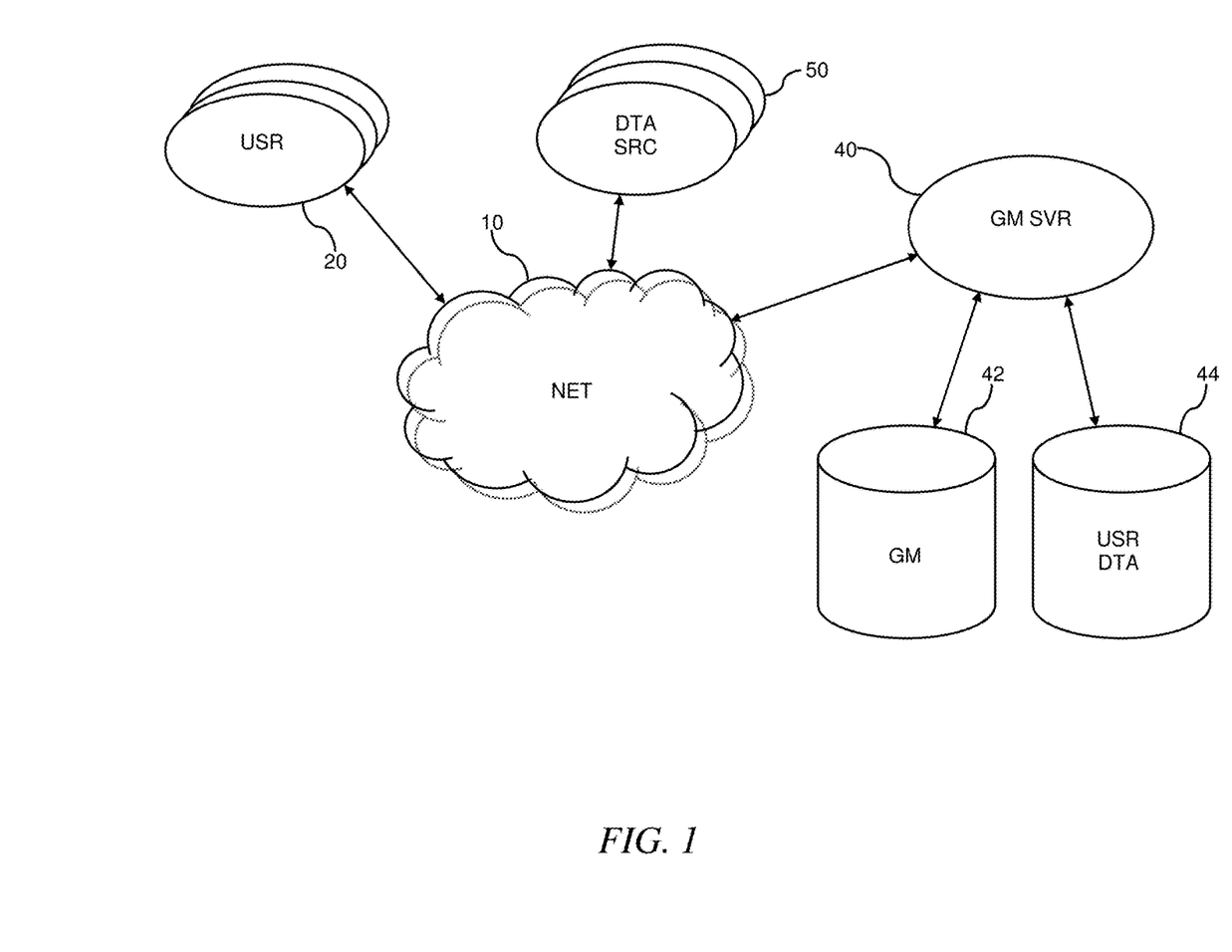
FIG. 1 illustrates schematic view of a skill gaming system.

Referring to FIG. 1, a schematic view of a gaming system is shown. Multiple user devices 20 (computers, smart phones, etc.) connect to the gaming server 40 through a network 10, for example, through the Internet 10.

Game details and settings are stored in a game storage area 42, such as, in the stock market example, the list of x stocks, the starting date and time, the ending date and time, and the number of stocks each player must select.

The user selects a game and enters their outcome predictions through a user interface (see FIGS. 3-7), and the entered data is stored in a user storage area 44. It is anticipated that each user/player must create an account, details of which are also stored in the user storage area 44. In some embodiments, the user creates an account under a unique username along with login credentials such as a password. In some embodiments, the user is required to provide additional information, for example, a valid email address, home address, phone number, date of birth, etc. In some embodiments, the user needs to provide a social security number for tax purposes, should the user be awarded significant winnings. Based upon a selected security policy, some or all of the data provided by each user is used for direct marketing, advertising, etc.

At the starting date and time, all user entries are locked and the game server 40 queries one or more data sources 50 for starting data, such as the pre-market position for each of the x stocks considered for the current game.

At the ending date and time, the game server 40 again queries one or more data sources 50 for ending data, such as the market-close position for each of the x stocks considered for the current game or the fantasy points earned by a set of players, etc. In some embodiments, the final statistical performance data from the data source(s) 50 is converted. For example, total passing yards for each of the x quarterbacks considered for the current game is translated into fantasy points. The game server 40 then determines, in this example, which of the two subsets of quarterbacks earned the most fantasy points.

Figure 3:
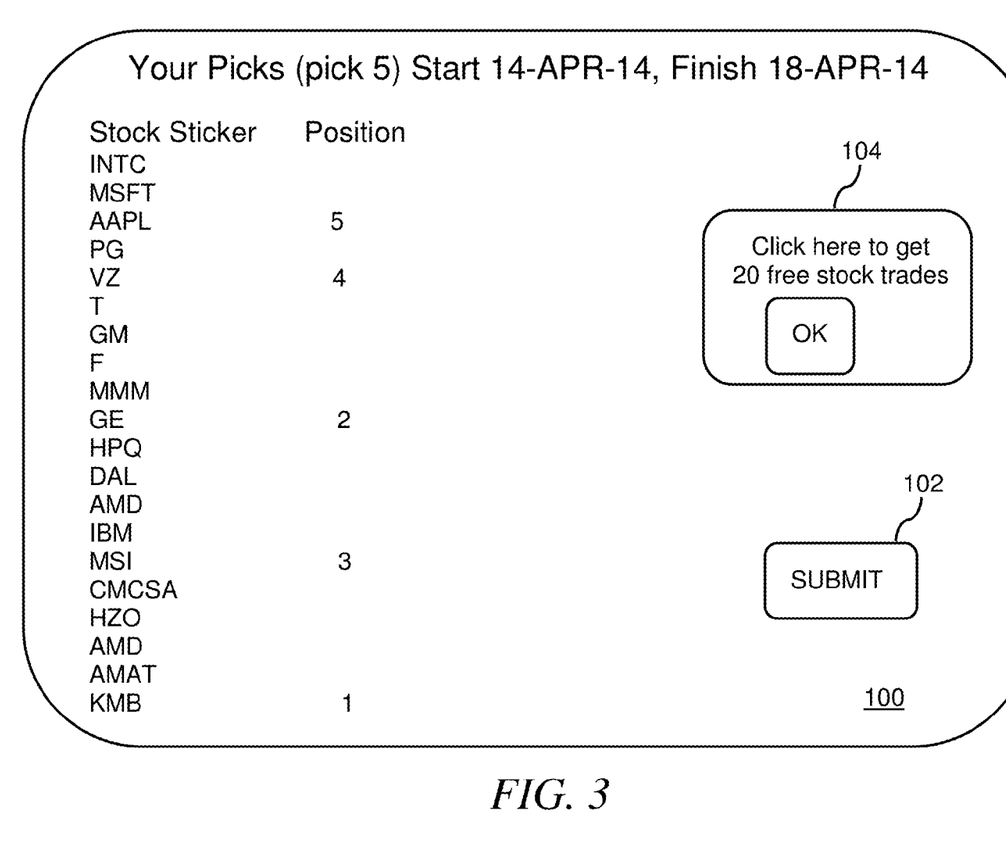
FIG. 3 illustrates an exemplary user interface of the gaming system where the objective involves stock market selection.
Figure 4:
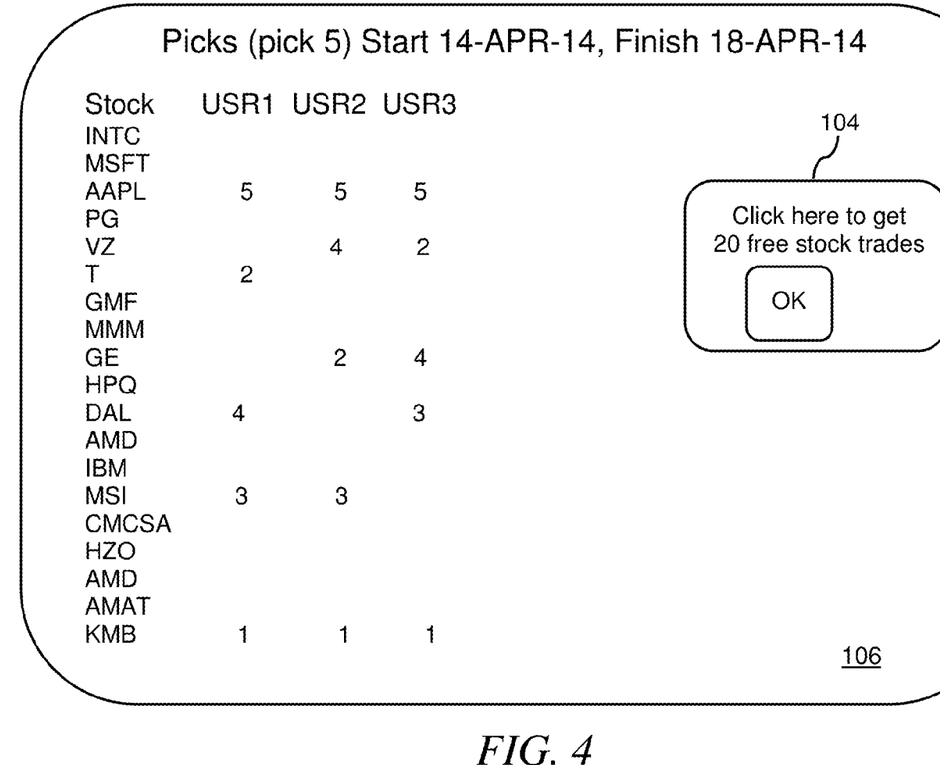
FIG. 4 illustrates a second exemplary user interface of the gaming system where the objective involves stock market selection.
Figure 5:
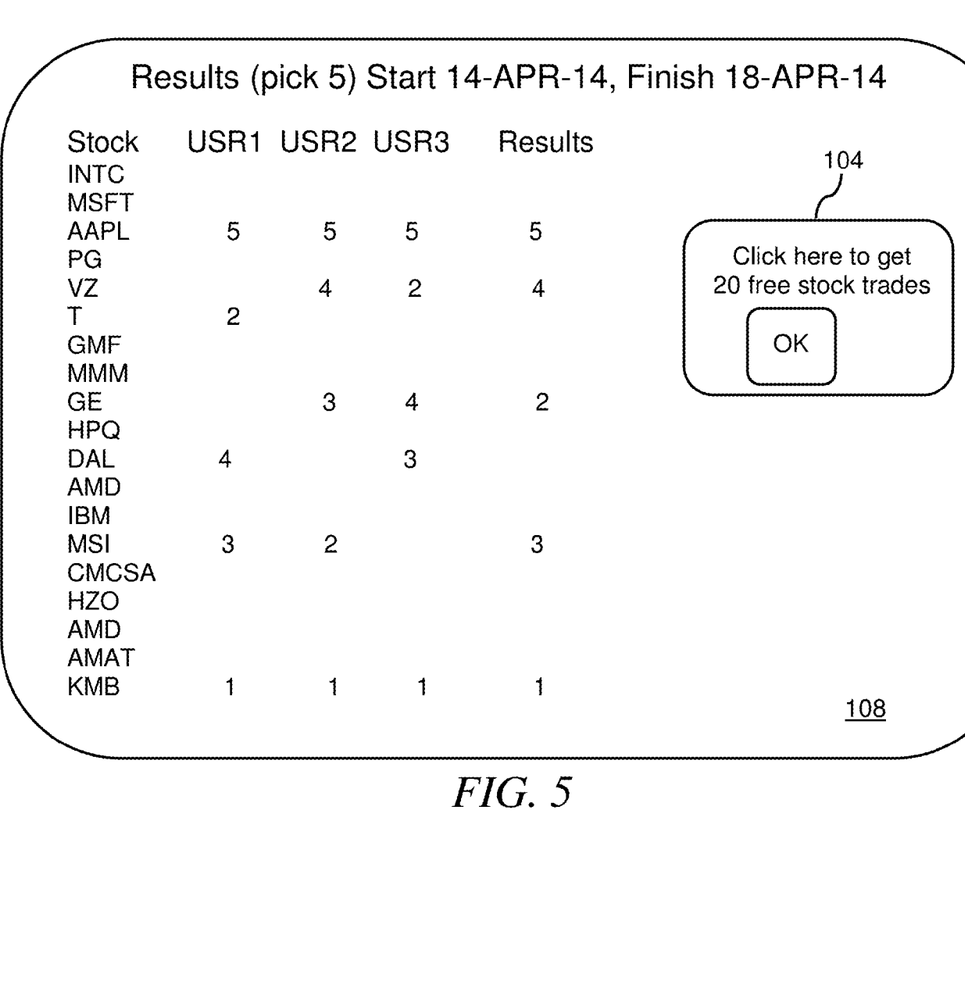
FIG. 5 illustrates a third exemplary user interface of the gaming system where the objective involves stock market selection.

In the exemplary game of FIGS. 3-5, the game server 40 then determines which of the x stocks gained the highest percentage, which of the x stocks gained the next highest percentage, and so forth until the game server 40 has determined the top n stocks, in order. Note, that although the top n stocks is used in this example, it is anticipated that, in some embodiments, a different order is required, such as the bottom n performing stocks, the middle n performing stock, the $3^{rd}$, $4^{th}$, $7^{th}$, $9^{th}$, and $10^{th}$ performing stocks, etc.

Once the game server 40 determines the n items (stocks), in order, the game server 40 accesses the user data 44 to determine if any of the users have correctly entered those n selections, in order. If one or more users have correctly entered those n selections, in order, then the game server 40 declares one or more contingent prize winners and awards, or signals an administrative function to award the winner(s) with the pre-set contingent prize. In some embodiments, the prize is money. In others embodiments, the prize is an award of something tangible such as a free pizza, discount coupons, etc. In some embodiments, the prize is a large sum of money, typically when the probability of making a winning selection is very small. For example, in a basket of 50 stocks, assuming the performance of each stock in the basket is equally random, picking the top five performing stocks in perfect order over a period of time out of this basket has a probability of one in 50*49*48*47*46, or one in around 254 million, again, assuming random results. In general, the probability of picking the top n performing stocks in perfect order out of a basket of x stocks is on in x!/(x−n)!, or in the example 50*49*48 . . . divided by 45*44*43 . . . , which yields 50*49*48*47*46. However, since some participants will be more skilled at selecting stocks that will show a gain during the period, the probability that they will be able to pick the top n performing stocks out of the basket in perfect order is higher than the equations mentioned above. Because many such games will be designed to provide a very low, insurable, probability of a win, it is anticipated that secondary prizes be awarded based on the cumulative scores of the participants, the number of stocks correctly predicted in the top n regardless of order, or the number of stocks predicted in the top n in perfect order (if less than n were correct), etc. In the example of picking all top five performing stocks in a basket of 50 stocks, if 1.5 million entries are made, again assuming the performance of each stock in the basket is equally random, the probability of declaring a contingent prize winner is less than 0.6%. If this is changed, for example, to a game scenario requiring picking of the top five performing stocks in a basket of 100 stocks and 1.5 million entries are made, the probability of declaring a winner is less than 0.02%. When factoring skill into the probability of declaring a winner, these probabilities will increase, but will likely increase by less than half (e.g. a participant knowing which stocks in the basket of 50 stocks is a good risk at most doubles that participants ability to select the top five performing stocks, in order, due to many factors, including market volatility, unpredictability, and randomness of the stock market.

The data sources 50 include any reputable source of outcomes such as newspapers (e.g., the Wall Street Journal), sport-based services, financial services, race track web sites, etc. In some embodiments, the data is directly downloaded from the data sources 50, through a network 10 (e.g., the Internet), while in other embodiments, the data is manually entered into the game server 40 through a user interface.

Figure 2:
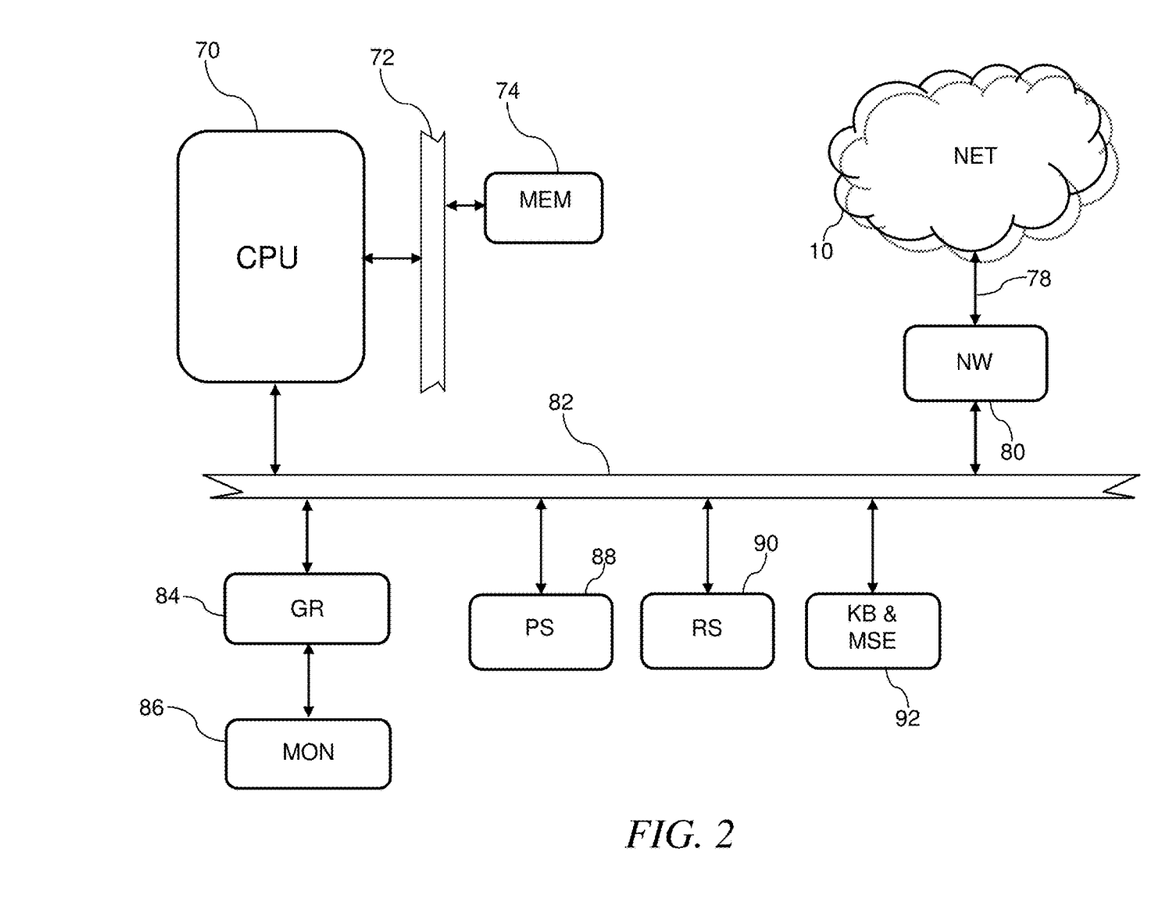
FIG. 2 illustrates a typical computer system.

Referring to FIG. 2, a schematic view of a typical computer system is shown. The example computer system represents a typical computer system used as the game server 40 and/or the user client devices 20. The example computer system is shown in its simplest form, having a single processor. Many different computer architectures are known that accomplish similar results in a similar fashion and the present invention is not limited in any way to any particular computer system. The present invention works well utilizing a single processor system, as shown in FIG. 2, a multiple processor system where multiple processors share resources such as memory and storage, a multiple server system where several independent servers operate in parallel (perhaps having shared access to the data), or any combination, etc. In such systems, a processor 70 executes or runs stored programs that are generally stored for execution within a memory 74. The processor 70 is any processor or a group of processors, for example an Intel Pentium-4® CPU or the like. The memory 74 is connected to the processor, for example, by a memory bus 72 and is any memory 74 suitable for connection with the selected processor 70, such as SRAM, DRAM, SDRAM, RDRAM, DDR, DDR-2, etc. Also interfaced to the processor 70 is a system bus 82, for example, interfacing peripheral subsystems such as a network interface 80, persistent storage (e.g. a hard disk) 88, removable storage (e.g. DVD, CD, flash drive) 90, a graphics adapter 84 and a keyboard/mouse 92, etc., to the processor 70. The graphics adapter 84 receives commands and display information from the system bus 82 and generates a display image that is displayed on the display 86.

In general, the persistent storage 88 is used to store programs, executable code and data such as user financial data in a persistent manner. The removable storage 90 is used to load/store programs, executable code, images and data onto the persistent storage 88. These peripherals are examples of storage devices 88/90 and other examples of persistent storage devices 88 include core memory, FRAM, flash memory, etc. Other examples of removable media storage 90 include CDRW, DVD, DVD writeable, Blu-ray, SD cards, other removable flash media, floppy disk, etc. In some embodiments, other devices are connected to the system through the system bus 82 or with other input-output connections/arrangements as known in the industry. Examples of these devices include printers; graphics tablets; joysticks; and communications adapters such as modems and Ethernet adapters.

The network interface 80 connects the computer-based system to the network 10 through a link 78 which is, preferably, a high speed link such as a cable broadband connection, a Digital Subscriber Loop (DSL) broadband connection, fiber optics, a T1 line, or a T3 line.

Referring to FIGS. 3, 4, and 5, exemplary user interfaces 100/106/108 of the gaming system are shown where the objective involves stock market selection.

In this example, the stock market is used as a basis for the described game, but any set of events is anticipated, including, but not limited to, outcomes of a set of sporting events (e.g. select 5 teams that will improve standings the most out of 20 teams during one week), the results of an automobile racing competition, the results of a golf tournament, the performance of sporting players (e.g. select 5 players who will improve their batting average the most out of 40 players over the next five days), the top 5 performing quarterbacks based on a fantasy sports scoring system, the top 5 performing running backs based on running yardage for a given week's football games, the results of a talent contest, or the number of views of a particular video on the Internet, etc. As is evident in the suggested possibilities, there is an amount of skill that provides a knowledgeable participant with an advantage over a participant having less knowledge. Knowledge helps a participant to make better selections. For example, knowing that a certain baseball player is in a hitting slump and has much more abilities than his/her current batting average and will likely improve in the short term leads a participant to select that player, though there is no guarantee that that particular player will start improving during the contest period and, therefore, the participant is not being provided a selection that cannot fail.

The stock market is one basis for the described game, though any set or mix of sets of skill/knowledge-based events is anticipated, including, but not limited to, outcomes of a set of sporting events (e.g., select 5 teams that will improve standings the most out of 25 teams during one week), the results of an automobile racing competition, the results of a golf tournament, the performance of sporting players (e.g., select 5 players who will improve their batting average the most out of 40 players over the next five days), the top 5 performing quarterbacks based on a fantasy sports scoring system, or the top 5 performing running backs based on running yardage for a given week's football games, the results of a talent contest, or the number of views of a particular video on the Internet, etc. Further, there is no limitation that any particular game be limited to a single genre of events. For example, an exemplary game involves selecting the winner of the Indianapolis 500 and the top three performing stocks from a basket of 25 stocks for the week just before Memorial Day.

In the exemplary interface of a game as shown in FIG. 3, US stocks are used and the basket size is 20 (x=20—there are 20 stocks in which to choose) and to win the contingent prize, the user must select the top 5 (n=5) performing stocks, in order, over the period of from Apr. 14, 2014 to Apr. 18, 2014. In the example of FIG. 3, the participant has selected KMB to perform the best, followed by GE, then MSI, then VZ, then AAPL. Once selections are made, the participant activates the submit function 102 and the selections are saved for that user in the user data 44. Performance of each individual stock is determined, for example, by a percentage gain during the period (in this example the period is Apr. 14, 2014 to Apr. 18, 2014). For example, GM gains 0.711 percent over a one-week interval.

In some embodiments, the participant must register before joining a game and entering a selection. In some embodiments, the participant must submit payment (e.g. by credit card or Paypal®) for the registration and/or to create an account. In some embodiments, the system is funded through advertising such as, for example, the advertisement 104.

After entering the participant's selections, in some embodiments, a user interface 106 as shown in FIG. 4 is presented showing the selections of the participant and the selections of other participants (e.g., USR1, USR2, USR3). Note that any number of participants is anticipated and, many different user interfaces are anticipated to visually depict the selections of those participants, including tabular user interfaces, list user interfaces, scrolling user interfaces, etc. There are no limitations on the number, style, format, or timing of presentation of any user interfaces.

After the period of time elapses (for example, after the close of the stock market on April 14), the game server 40 calculates, for example, the percentage gain of all 20 stocks present in the game and determines which of the 20 stocks gained the most, then which of the 20 stocks gained the next greatest amount, etc. In some embodiments, the results are then published, for example in a user interface 108 as shown in FIG. 5, ranking the top 5 stock market gainers out of the 20 stocks in the game. In this exemplary user interface 108, it is shown that the highest gaining stock for the period was KMB, followed by GE, then MSI, then VZ, then AAPL. Note that all participants selected KMB to be the highest gaining stock and selected MSFT to be the fifth highest gaining stock, but none of the participant selected all five of the top highest gaining stocks, in order. Note that participant named USR2 selected the correct top five performing stocks for the period, but did not select the top five performing stocks for the period in order, as this participant selected MSI to perform second where MSI performed third and this participant selected GE to perform third where GE performed second.

In a first game scenario, a prize is awarded for having selected the requisite number of outcomes in order. In the example above using the first scenario, none of the three participants wins. In a second game scenario, a prize is awarded for having selected the requisite number of outcomes in order and a secondary prize is awarded for having selected the requisite number of outcomes in any order. In the examples above using the second scenario, none of the three participants wins the primary prize, but the second participant (USR2) wins the secondary prize. In a third game scenario, a prize is awarded for having selected the requisite number of outcomes in order and a secondary prize is awarded for having selected the requisite number of outcomes in any order, divided equally between all participants that selected the requisite number of outcomes in any order. In the example above using the third scenario, none of the three participants wins the primary prize, but the second participant (USR2) wins the secondary prize. Since there is only one winner of the secondary prize, the second participant wins the entire secondary prize. If there were two winners of the secondary prize, each winning participant receives half of the secondary prize, etc.

Referring back to FIG. 3, if the stock, KMB, gained the most, followed by GE, then MSI, then VZ, then AAPL (in that order), then the participant who submitted the selections 100 is be declared a winner of the contingent prize. By using a basis for the game such as stock market gains, it is very difficult for any participant to determine which n stocks will gain the most during any particular period of time, especially if the participant must also determine the order. Even if the participant(s) understand the market very well and predict a certain stock to gain during that period, and they are correct, another stock may gain a higher percentage and their selection will not win.

As another example of how the game server 40 determines the winners, each of the top n assets will have a maximum potential score of m for each selection. Therefore a competition to pick the top five (n=5) where m=100, the maximum total score would be 500. The score for each selection will be based on the user's predicted rank of the asset and the final rank of the asset. Each user will be scored by subtracting the difference between the user's selected rank of the asset in the top n list and the final rank of the asset. If the asset selected by the user does not appear in the top n list, the score for that asset is zero. Therefore, if the user selects an asset that finishes in the top n list, the user is awarded points as:

Asset Score=$m-ABS$(UserRank−FinalRank)

For example, if the user picked AAPL to finish in the third position (#3) and AAPL finished in the fifth position (#5) in a game with five selections, the score for that selection would be 100−ABS(3−5), or 98. Therefore, if the user selects the top five assets in order, the user's score would be:

100−ABS(1−1)+100−ABS(2−2)+100−ABS(3−3)+ 100−ABS(4−4)+100−ABS(5−5)

which is 500 or, a perfect score for a game in which n is 5 and m is 100.

If the user picked the first 4 performers in correct order, but missed the fifth by 10 places, the score would be:

100−ABS(1−1)+100−ABS(2−2)+100−ABS(3−3)+ 100−ABS(4−4)+100−(5−15)which is 490.

Many mathematical systems are anticipated to provide more or less granularity for determining if there is a contingent prize winner (selected all n items in order) and, if there is no contingent prize winner, mathematical systems for selecting the best selection out of all entries or selecting one or more participant selections eligible for various prizes. The above examples are just that, examples, and all possible ranking algorithms are anticipated and included here within.

Depending upon the game rules established before the start of the game, it is anticipated that there are different types of games using the top n out of x items system described above. In one game scenario, a perfect selection of the top n out of x items is required to win the contingent prize. If nobody selects the top n out of x items, nobody wins the contingent prize. Such a game is anticipated for use in attracting players to a web site for promotional or advertisement purposes, typically without requiring the player to pay any money.

In another game scenario, the prize is not contingent and a perfect selection is not required to win the prize, and the player with the highest score wins. Such a game is anticipated for use where each player is required to pay a certain amount of money.

In another game scenario, there is both a contingent prize for achieving a perfect score as well as a prize for the highest score, next highest score, etc. Such a game is anticipated for use where each player is required to pay a certain amount in entry fees, further providing incentives to play by way of the typically large winnings provide to anyone who selects the top n out of x items.

In one game scenario, an game of skill is based upon a player's selections compared to the performance of a selected number of quarterbacks, n, out of a basket of quarterbacks, x, over a period of time, t. In this scenario, the number of quarterbacks a player must pick, n, the number of quarterbacks in the basket of quarterbacks, x, or the time period of time, t, is set to maximize, for example, participation, profitability, advertising hits, fun, and results of the game.

Figure 6:
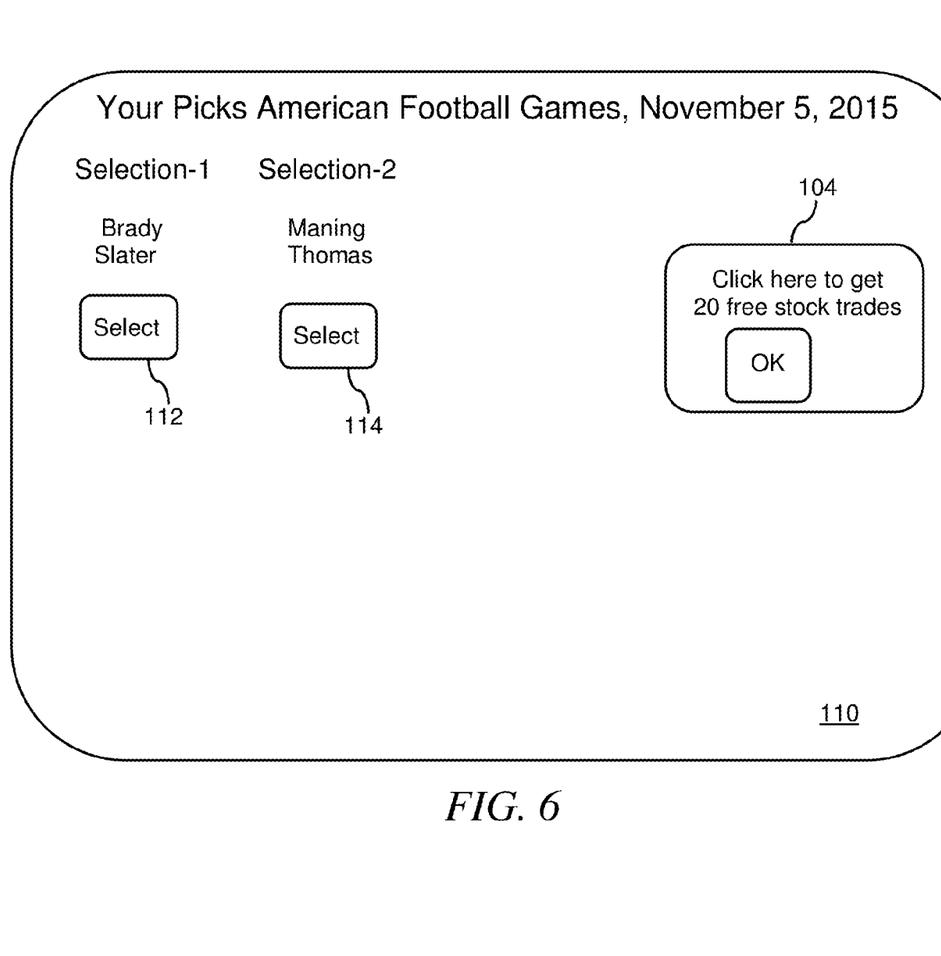
FIG. 6 illustrates an exemplary user interface of the gaming system where the objective involves selection from baskets of American football players.
Figure 7:
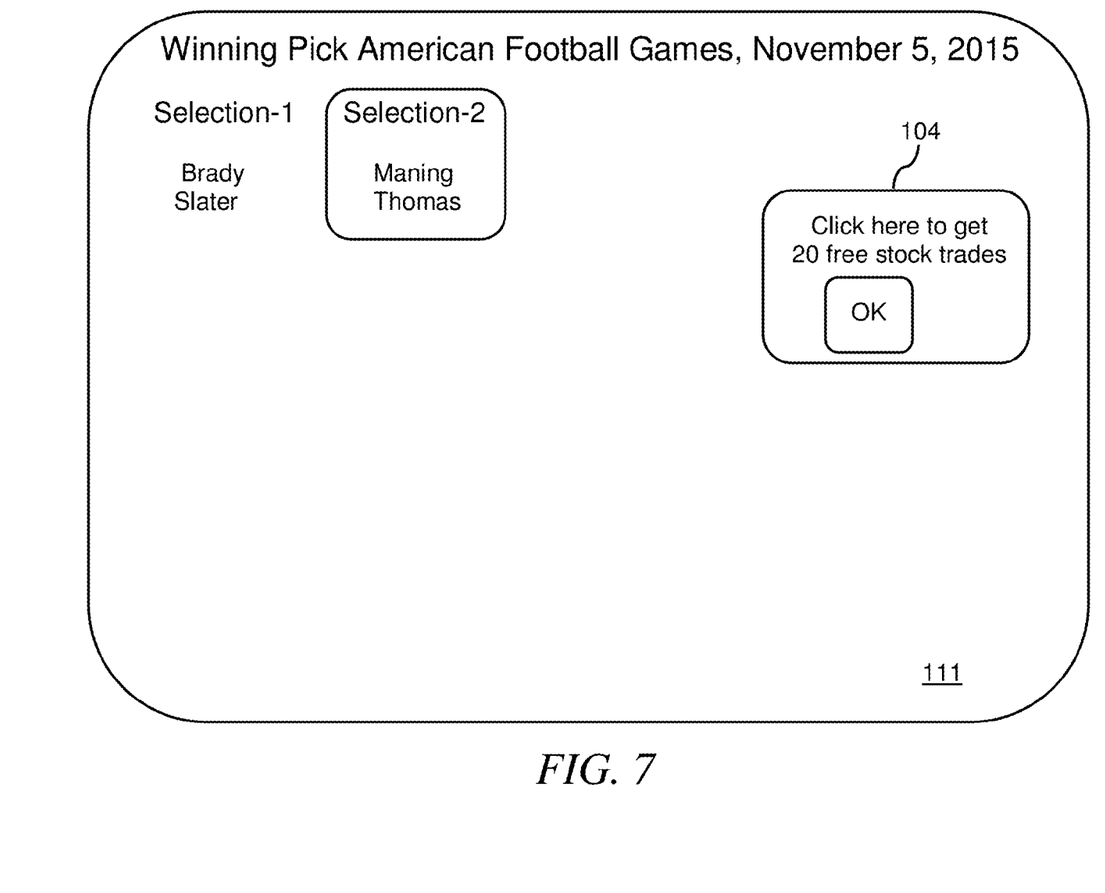
FIG. 7 illustrates a second exemplary user interface of the gaming system where the objective involves selection from baskets of American football players.

Referring to FIGS. 6 and 7, another set of exemplary user interfaces 110 of the gaming system are shown where the objective involves American football. In this, game details and settings are stored in a game storage area 42, such as, in this fantasy sports-based example, the sets of players (e.g., quarterbacks), the starting date and time, the ending date and time, and the selections made by each participant.

The participant selects this game and enters their outcome predictions through a user interface (see FIG. 6), and the entered data is stored in a user storage area 44. It is anticipated that each participant create an account prior to entering, details of which are also stored in the user storage area 44. In some embodiments, the participant creates an account under a unique username along with login credentials such as a password. In some embodiments, the user is required to provide additional information, for example, a valid email address, home address, phone number, date of birth, etc. In some embodiments, the user needs to provide a social security number for tax purposes, should the user be awarded significant winnings. Based upon a selected security policy, some or all of the data provided by each user is used for direct marketing, advertising, etc.

At the starting date and time, all participant entries are locked. At the ending date and time, the game server 40 queries one or more data sources 50 for ending data, such as the total passing yards for each of the included quarterbacks considered for the current game. The game server 40 then determines, in this example, which of the quarterbacks gained the most passing yards, which of the quarterbacks gained the next most passing yards, and so forth until the game server 40 has determined the top winning combination. Once the game server 40 determines the winning selection, the game server 40 accesses the user data 44 to determine if any of the participants have selected the winning selection. If one or more participants have selected the winning selection, then the game server 40 declares one or more contingent prize winners and awards, or signals an administrative function to award the winner(s) with the pre-set contingent prize divided by the number of participants that made the correct selection.

Figure 8:
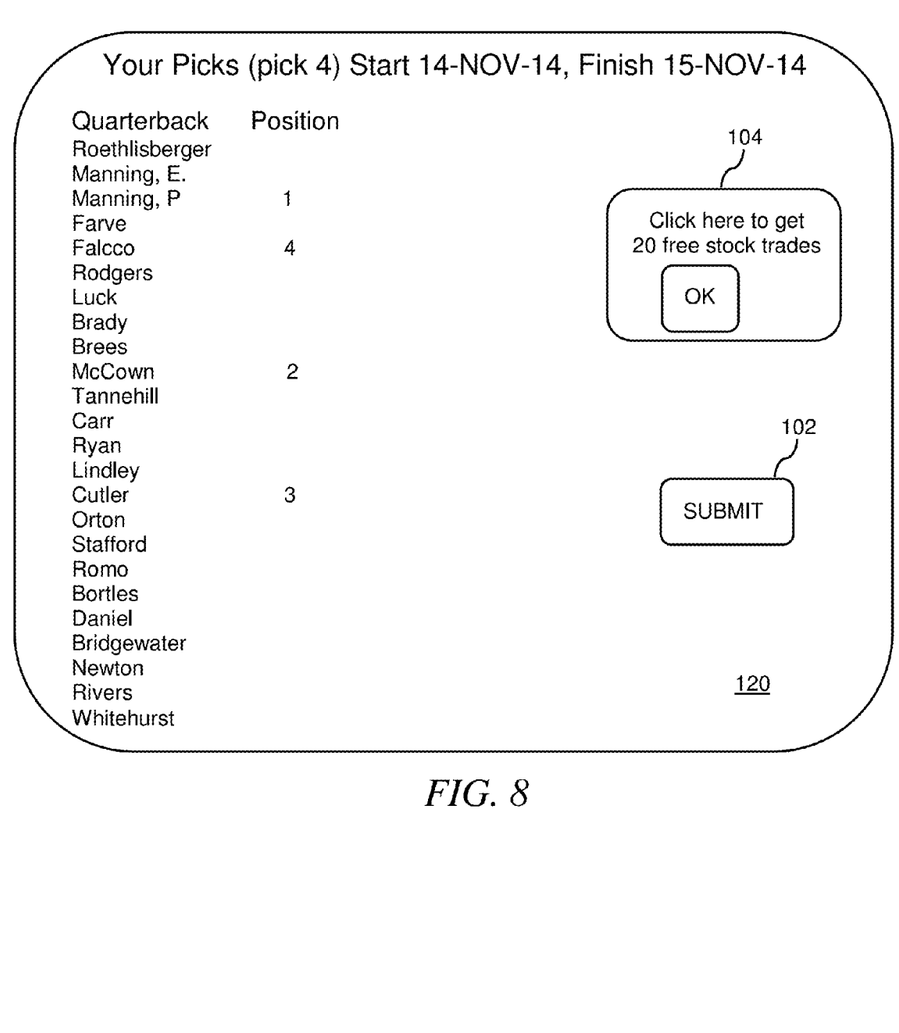
FIG. 8 illustrates an exemplary user interface of the gaming system where the objective involves selecting the top quarterbacks for a given time period (e.g. week), in perfect order.
Figure 9:
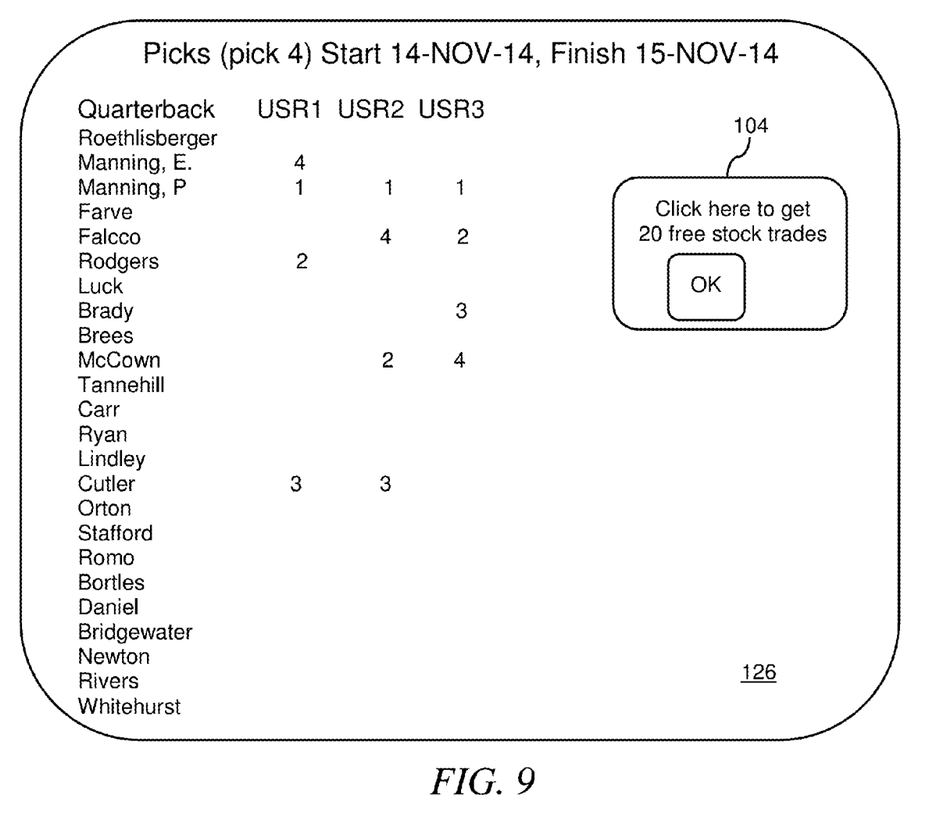
FIG. 9 illustrates a second exemplary user interface of the gaming system where the objective involves selecting the top quarterbacks for a given time period (e.g. week), in perfect order.
Figure 10:
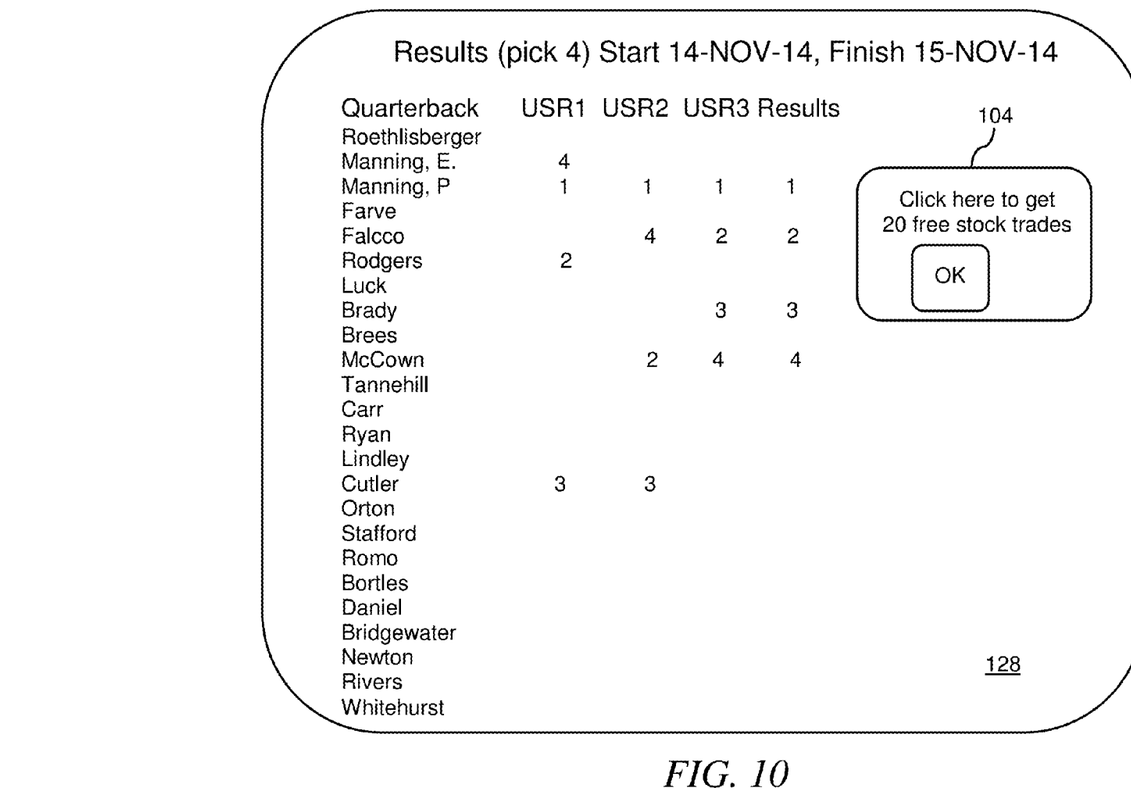
FIG. 10 illustrates a third exemplary user interface of the gaming system where the objective involves selecting the top quarterbacks for a given time period (e.g. week), in perfect order.

Referring to FIGS. 8, 9, and 10, exemplary user interfaces 120/126/128 of the gaming system are shown where the objective involves selection of quarterback results. Note, that although the top n quarterbacks is used in this example, it is anticipated that, in some games, a different order is desired, such as the bottom n performing quarterbacks, the middle n performing quarterback, the $3^{rd}$, $4^{th}$, $7^{th}$, $9^{th}$, and $10^{th}$ performing quarterbacks, etc.

In FIG. 8, the participant is presented a user interface 120 (this is an example, and any date entry user interface is anticipated) for entering the participant's selections. In this game, the participant selects the top four quarterbacks, in order, over a period of time. In this example, the participant selected Manning, P as the top performing quarterback, followed by McCown, Cutler, and then Flacco. Once the participant is happy with their selections, the participant operates the submit function 102 and the selections are stored in the user data 44.

After several participants have made their selections, a list of selections are presented in another user interface 126. This showing of picks user interface 126 is greatly simplified and any user interface is anticipated, including scrolling, paging, etc., as it is anticipated that there will be many participants. Also note that, as with previous examples, in some embodiments, advertising 104 is displayed. Any advertising is anticipated, including descriptive or functional advertisement, advertisement windows with motion video, etc.

At the completion of the time period (t), the game server queries one or more data sources 50 to determine the ranking of the quarterbacks. The game server 40 determines the n items (quarterbacks), in order then the game server 40 accesses the user data 44 to determine if any of the participants have correctly entered those n selections, in order. If one or more participant s have correctly entered those n selections, in order, then the game server 40 declares one or more contingent prize winners and awards, or signals an administrative function to award the winner(s) with the pre-set contingent prize. In some embodiments, the prize is a large sum of money and the probability of making a winning selection is very small. For example, in a basket of 24 quarterbacks (as per example in FIGS. 8-10), assuming the performance of each quarterback in the basket is equally random, picking the top four performing quarterbacks in perfect order over a period of time out of this basket has a probability of one in 24*23*22*21, or one in 255,000. If, instead, n is 8, then the probability is 24*23*22*21*20*19*18*17, or one in around 29.6 billion, assuming random results. In general, the probability of picking the top n performing quarterbacks in perfect order out of a basket of x quarterbacks is on in x!/(x−n)!, or in the example 24*23*22 . . . *1 divided by 16*15*14 . . . *1, which yields 24*23*22*21*20*19*18*17. However, since not all quarterbacks perform equally and some participants will be more skilled at selecting quarterbacks, the probability that some participants will be able to pick the top n performing quarterbacks out of the basket in perfect order is much higher than the equations mentioned above. For example, using one particular fantasy points scoring methodology, selecting the top eight quarterbacks based on the mean and standard deviation of their past performance reduced the odds of selecting all eight in perfect order to approximately one in 80 million. Because many such games will be designed to provide a very low, insurable, probability of a win, it is anticipated that secondary prizes be awarded based on the cumulative scores of the participants, the number of quarterbacks correctly predicted in the top n regardless of order, or the number of quarterbacks predicted in the top n in perfect order, etc. In the example of picking all top eight performing quarterbacks in perfect order in a basket of 24 quarterbacks, if 1.0 million entries are made, again assuming the performance of each quarterback in the basket is equally random, the probability of declaring a contingent prize winner is less than 0.0034%. When factoring skill into the probability of declaring a winner, these probabilities will increase. For example if 1.0 million entries are made where entrants base their selections on the historically top performing quarterbacks by mean and standard deviation, the probability of declaring a contingent prize winner increases to 1.25%.

In some embodiments, after the time period, t, terminates, the results are published, for example in a user interface 128 as shown in FIG. 10, ranking the top 4 quarterbacks out of the 24 quarterbacks in the game. In this exemplary user interface 128, it is shown that the highest ranked quarterback for the period was Manning, P., followed by Flacco, then Brady, then McCown. Note that all participants selected Manning, P. to be the highest rated quarterback. In the example shown in FIG. 10, one participant (USR2) selected all four of the top rated quarterbacks, in order.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A gaming system comprising:
a server;
a basket comprising a plurality of events;
a plurality of participant devices connected to the server, the participant devices accepting participant selections before a start of a period of time, each participant selection comprising an ordered list of a subset of the events in the basket;
determining the results of the plurality of events in the basket over the period of time; and
determining a score of the participant selections based upon the results, and if the score of a participant selection exceeds a threshold, declaring the participant selection a winner;
wherein each of the plurality of events have both an element of predictability and an element of randomness.

2. The gaming system of claim 1, wherein the threshold is a perfect score.

3. The gaming system of claim 1, wherein the plurality of events comprises performances of a set of stocks over the period of time and the step of determining includes measuring a percentage gain of each of the stocks over the period of time, and sorting the stocks in order of the stocks with the greatest percentage gain during the period of time.

4. The gaming system of claim 3, wherein the step of determining includes comparing each of the participant selections to a top subset of the stocks in order and if any of the participant selections matches the top subset of the stocks in order, that participant selection is declared a winner of a contingent prize.

5. The gaming system of claim 1, further comprising determining which of the participant selections are closest to matching top subset of the stocks in order and declaring one or more participants as winners of one or more secondary prizes.

6. The gaming system of claim 1, wherein the plurality of events comprises performances of a set of athletes over the period of time and the step of determining the results includes measuring the performance of each athlete based on objective performance criteria, scoring, player statistics, and/or fantasy points scoring system.

7. The gaming system of claim 1, wherein the plurality of events comprises performances of a set of individual athletes who participate in a team sport over the period of time and the step of determining the results includes measuring the performance of each individual athlete based on objective performance criteria.

8. The gaming system of claim 1, wherein the plurality of events comprises performances of a set of people who participate in a competitive activity selected from a group consisting of a video game competition, a chess competition, a beauty contest, a music contest, and a talent contest over a period of time, and the step of determining the results includes measuring the performance of each of the people based on objective performance criteria.

9. The gaming system of claim 1, wherein the plurality of events comprises performances of a set of items that are measured over the period of time selected from the group consisting of songs, videos, postings, tweets, and pictures over a period of time, and the step of determining the results includes measuring the performance of each item based on objective performance criteria.

10. A gaming system comprising:
a server;
a set of x events occurring over a period of time;
a plurality of participant selections, each participant selection consisting of n of the events, in an order of expected results, where n is less than x;
software running on the server determines an order of the set of x events at the end of the period of time; and
the software running on the server determines if any of the selections match the order of the set of x events, declaring the participant a winner;
wherein each of the x events have both an element of predictability and an element of randomness.

11. The gaming system of claim 10, wherein the set of events comprises a set of stocks and the software running on the server measures a percentage gain of each of the stocks over the period of time.

12. The gaming system of claim 10, wherein the set of events comprises a set of sporting players and the software running on the server measures a performance of each of the sporting players over the period of time.

13. The gaming system of claim 12, wherein the sporting players participate in a team sport.

14. The gaming system of claim 10, wherein the set of events comprises a set of people who participate in a competitive activity selected from a group consisting of a video game competition, a chess competition, a beauty contest, a music contest, and a talent contest over a period of time, and the software running on the server measures the performance of each of the people based on objective performance criteria.

15. The gaming system of claim 10, wherein the set of events comprises performances of a set of items that are measured over the period of time selected from the group consisting of songs, videos, postings, tweets, and pictures over a period of time, and the software running on the server measures the performance of each item based on objective performance criteria.

16. A method of gaming comprising:
  participants selecting n events from a set of x events where n is less than x, in an order of expected results over a period of time;
  after the period of time elapses, determining the order of the set of x events; and
  comparing each selected set of n events to a corresponding n events from the set of x, and if any of the selected sets match the corresponding n events from the set of x, declaring the any of the selected sets a winner;
  wherein each of the set of x events have both an element of predictability and an element of randomness.

17. The method of claim 16, wherein the set of events comprises a set of stocks and step of determining the order of the set of x includes measuring a percentage gain of each of the stocks in the set of stocks over the period of time.

18. The method of claim 16, wherein the set of events comprises a set of sporting players and the step of determining the order of the set of x includes measuring a performance of each of the sporting players over the period of time.

19. The method of claim 16, wherein the comparing each selected set of n events to a corresponding n events from the set of x, requires the set of n events to match the corresponding n events from the set of x in order.

20. The method of claim 16, wherein the set of events comprises a set of people who participate in a competitive activity selected from a group consisting of a video game competition, a chess competition, a beauty contest, a music contest, and a talent contest over a period of time, and the step of determining the order of the set of x includes measuring the performance of each of the people based on objective performance criteria.

* * * * *